(12) United States Patent
Klubnichkin et al.

(10) Patent No.: US 12,493,539 B2
(45) Date of Patent: Dec. 9, 2025

(54) SYSTEM AND METHOD FOR TRIGGERING A VISUAL INDICATOR OF A FAULTY MEMORY DRIVE

(71) Applicant: Direct Cursus Technology L.L.C, Dubai (AE)

(72) Inventors: Konstantin Aleksandrovich Klubnichkin, Moscow (RU); Igor Iurevich Znamenskii, Drozhzhino (RU); Andrey Alekseevich Blokhin, Moscow (RU); Andrey Olegovich Korolenko, Moscow (RU); Nikita Aleksandrovich Vedeneev, Vladimir (RU); Ivan Vladimirovich Prostov, Moscow (RU); Oleg Valerevich Fedorov, Moscow (RU)

(73) Assignee: Y.E. Hub Armenia LLC, Yerevan (AM)

( * ) Notice: Subject to any disclaimer, the term of this patent is extended or adjusted under 35 U.S.C. 154(b) by 37 days.

(21) Appl. No.: 18/692,710

(22) PCT Filed: Sep. 16, 2021

(86) PCT No.: PCT/RU2021/000398
§ 371 (c)(1),
(2) Date: Mar. 15, 2024

(87) PCT Pub. No.: WO2023/043328
PCT Pub. Date: Mar. 23, 2023

(65) Prior Publication Data
US 2025/0138973 A1    May 1, 2025

(51) Int. Cl.
*G06F 11/32* (2006.01)
*G06F 11/30* (2006.01)

(52) U.S. Cl.
CPC ........ *G06F 11/326* (2013.01); *G06F 11/3034* (2013.01); *G06F 11/3041* (2013.01)

(58) Field of Classification Search
CPC ............... G06F 11/326; G06F 11/3034; G06F 11/3041; G11C 2029/0409; G11C 29/44
See application file for complete search history.

(56) References Cited

U.S. PATENT DOCUMENTS 6,349,335 B1 *  2/2002  Jenney ................ H04L 43/0817
                                                      714/48
9,047,181 B2 *  6/2015  Noel ....................... G06F 9/542
(Continued)

FOREIGN PATENT DOCUMENTS

| CN | 107368385 A | 11/2017 |
|---|---|---|
| CN | 110618918 A | 12/2019 |
| TW | 201705723 A | 2/2017 |

OTHER PUBLICATIONS

Search report issued on May 27, 2025 by the Taiwan Intellectual Property Office in respect of the counterpart Taiwan patent application No. 111135257.

*Primary Examiner* — Michael Maskulinski
*Assistant Examiner* — Kayo Lisa Rusin
(74) *Attorney, Agent, or Firm* — BCF LLP

(57) ABSTRACT

There is provided a system having a server unit with a host processor and a service processor, a first bus interface and a second bus interface, a data storage unit with a plurality of drives grouped into a first and second group, a first serial-to-parallel-input/output (S2PIO) device connected to the first group, and a second S2PIO device connected to the second group. The system is configured to acquire, by the service processor from the host processor, an indication of a faulty memory drive in the data storage unit, the indication being indicative of a target link amongst the first link and the second link, and a position of the faulty memory drive in the (Continued)

target group. The system is configured to transmit, by the service processor using the target link, a command to a target S2PIO device for triggering a visual indicator associated with the faulty memory drive.

20 Claims, 5 Drawing Sheets

(56) References Cited

U.S. PATENT DOCUMENTS

| | | | |
|---|---|---|---|
| 9,198,060 B2* | 11/2015 | Terwilliger | H04W 24/04 |
| 9,367,510 B2 | 6/2016 | Dhandapani | |
| 9,936,603 B2 | 4/2018 | Stewart et al. | |
| 10,310,745 B2* | 6/2019 | Wu | G06F 3/0688 |
| 10,355,925 B2* | 7/2019 | Condict | H04L 41/0681 |
| 11,983,080 B2* | 5/2024 | Sun | G06F 11/1662 |
| 2014/0213177 A1* | 7/2014 | Terwilliger | H04W 24/04 |
| | | | 455/41.1 |
| 2017/0046227 A1 | 2/2017 | Fan et al. | |
| 2017/0206110 A1* | 7/2017 | Huang | G06F 9/50 |
| 2018/0107409 A1* | 4/2018 | Condict | G06F 3/0631 |
| 2018/0213669 A1 | 7/2018 | Kochukunju et al. | |
| 2018/0288152 A1* | 10/2018 | Chagam Reddy | G06F 3/0635 |
| 2019/0155547 A1 | 5/2019 | Lee et al. | |
| 2019/0187909 A1* | 6/2019 | Pinto | G06F 3/0683 |
| 2020/0028902 A1 | 1/2020 | Rajagopalan et al. | |
| 2020/0241984 A1 | 7/2020 | Shim et al. | |
| 2025/0094283 A1* | 3/2025 | Cocagne | G06F 11/1076 |

* cited by examiner

SYSTEM AND METHOD FOR TRIGGERING A VISUAL INDICATOR OF A FAULTY MEMORY DRIVE

CROSS-REFERENCE

The present application is a U.S. national stage entry of International Patent Application No. PCT/RU2021/000398, filed on Sep. 16, 2021, entitled "System and Method for Triggering a Visual Indicator of a Faulty Memory Drive", the entirety of which is incorporated herein by reference.

FIELD

The present technology relates to data storage solutions and, specifically, to a method and system for triggering visual indicators of faulty memory drives.

BACKGROUND

Storage requirements for storing digital data are continuously increasing due to the large volume of digital data that is being created every day. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, can span multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

US Patent application no. 2020/0028902 discloses a chassis including a plurality of nodes, a network switch, and a programmable device configured to manage a shared resource of the chassis.

SUMMARY

Developers of the present technology have appreciated certain technical drawbacks associated with prior art.

Developers of the present technology have realized that some solutions employ a bus interface between a BaseBoard Management Controller (BMC) of a server unit and a BMC of a storage unit for inter alia sending commands for triggering visual indicators of faulty drives. However, BMC-BMC communication is inefficient as it is prone to timeouts, re-tries, and other reasons stemming from the complexity of multi-layer communication protocols that are employed for establishing BMC-BMC communication.

Broadly speaking, the BMC of a server unit is located on the server's motherboard and is used for monitoring the physical state of the server unit. It is a specialized microcontroller that can be embedded on the motherboard of a computer, such as a server unit. A BMC can also manage the interface between system-management software and platform hardware. A BMC can have its own firmware and volatile memory. It should be noted that different types of sensors built into the server unit can report to the BMC on parameters such as temperature, cooling fan speeds, power status, operating system (OS) status, etc. The BMC can monitor the sensors and can send alerts to a system administrator via the network if any of the parameters do not stay within pre-set limits, indicating a potential failure in the system. The administrator can also remotely communicate with the BMC to take some corrective actions-such as resetting or power cycling the system to get a hung OS running again. These abilities may reduce a total cost of ownership or operation of a system.

Developers of the present technology have devised a system comprising a server unit, a data storage unit and a bus architecture for providing more efficient communication capabilities between the server unit and the data storage unit. More particularly, the BMC-BMC communication link present in other known solutions may no longer be needed in a bus architecture that is implemented in accordance with the non-limiting embodiments of the present technology, the bus architecture being between the server unit and the data storage unit. The bus architecture disclosed herein may allow to inter alia trigger visual indicators of faulty drives without the need for the BMC of a server unit to communicate with a BMC of a data storage unit.

In a first broad aspect of the present technology, there is provided a system comprising: a server unit including a host processor for generating input/output (I/O) operations and a service processor for monitoring a physical state of the server unit; and a first bus interface for transmitting the I/O operations from the host processor to a data storage unit for execution. The data storage unit includes: a plurality of memory drives for executing the I/O operations, where the plurality of memory drives has been grouped into a first group and a second group, and where a given memory drive from a respective group (i) is associated with a respective position in the respective group and (ii) has a respective visual indicator indicative of a status of the given memory drive; a first serial-to-parallel-input/output (S2PIO) device connected to the first group for controlling visual indicators of the respective ones from the first group, a second S2PIO device connected to the second group for controlling visual indicators of the respective ones from the second group. The system comprises a second bus interface for transmitting commands from the service processor to the first and second S2PIO devices, where the second bus interface includes a first link between the service processor and the first S2PIO device and a second link between the service processor and the second S2PIO device. The system is configured to acquire, by the service processor from the host processor, an indication of a faulty memory drive in the data storage unit. The indication is indicative of a target link amongst the first link and the second link, and a position of the faulty memory drive in the target group. The target link is connected to a target S2PIO device amongst the first S2PIO device and the second S2PIO device, and the target S2PIO device is connected to a target group associated with the faulty memory drive amongst the first and the second group. The system is configured to transmit, by the service processor using the target link, a command to the target S2PIO device, and where the command is for causing the target S2PIO device to trigger a visual indicator associated with the faulty memory drive based on the position of the faulty memory drive in the target group.

In some embodiments of the system, the first S2PIO and the second S2PIO have respective unique identifiers. The system is further configured to transmit, by the target S2PIO to the service processor, an indication of the unique identifier of the target S2PIO. The unique identifier of the target S2PIO and the position of the faulty memory drive in the target group form a unique identifier of the faulty memory drive in the data storage unit.

In some embodiments of the system, the service processor of the server unit is a BaseBoard Management Controller (BMC) of the server unit.

In some embodiments of the system, the first bus interface is a Serial AT Attachment (SATA) bus interface.

In some embodiments of the system, the second bus interface is an Inter-Integrated Circuit (I2C) bus interface, and where the first link is a first I2C link and the second link is a second I2C link.

In some embodiments of the system, the data storage unit is a just-a-bunch-of-disks (JBOD) unit.

In some embodiments of the system, the plurality of memory drives comprises at least one of a Hard Disk Drive (HDD) and a Solid-State Drive (SSD).

In some embodiments of the system, the S2PIO device is a General Purpose I/O (GPIO) expander device.

In some embodiments of the system, the GPIO expander device is a PCA9995.

In some embodiments of the system, the S2PIO device is a Complex Programmable Logic Device (CPLD).

In some embodiments of the system, the S2PIO is a Field-Programmable Gate Array (FPGA).

In a second broad aspect of the present technology, there is provided a computer-implemented method of triggering an indicator of a faulty memory drive. The method is executable by a system. The system comprises: a server unit including a host processor for generating input/output (I/O) operations and a service processor for monitoring a physical state of the server unit; and a first bus interface for transmitting the I/O operations from the host processor to a data storage unit for execution. The data storage unit includes a plurality of memory drives for executing the I/O operations, where the plurality of memory drives has been grouped into a first group and a second group. A given memory drive from a respective group (i) is associated with a respective position in the respective group and (ii) has a respective visual indicator indicative of a status of the given memory drive. The system comprises a first serial-to-parallel-input/output (S2PIO) device connected to the first group for controlling visual indicators of the respective ones from the first group, and a second S2PIO device connected to the second group for controlling visual indicators of the respective ones from the second group, and a second bus interface for transmitting commands from the service processor to the first and second S2PIO devices, where the second bus interface includes a first link between the service processor and the first S2PIO device and a second link between the service processor and the second S2PIO device. The method comprises acquiring, by the service processor from the host processor, an indication of a faulty memory drive in the data storage unit. The indication is indicative of a target link amongst the first link and the second link, and a position of the faulty memory drive in the target group. The target link is connected to a target S2PIO device amongst the first S2PIO device and the second S2PIO device, and the target S2PIO device is connected to a target group associated with the faulty memory drive amongst the first and the second group. The method comprises transmitting, by the service processor using the target link, a command to the target S2PIO device, where the command is for causing the target S2PIO device to trigger a visual indicator associated with the faulty memory drive based on the position of the faulty memory drive in the target group.

In some embodiments of the method, the method further comprises transmitting, by the target S2PIO to the service processor, an indication of the unique identifier of the target S2PIO. The unique identifier of the target S2PIO and the position of the faulty memory drive in the target group form a unique identifier of the faulty memory drive in the data storage unit.

In a third broad aspect of the present technology, there is provided a system comprising: a server unit including a processor for generating input/output (I/O) operations and a Baseboard Management Controller (BMC) for monitoring a physical state of the server unit; and a just-a-bunch-of-disks (JBOD), the JBOD coupled to the server unit by a SATA bus for receiving the I/O operations from the processor. The JBOD includes a plurality of memory drives for executing the I/O operations, and the plurality of memory drives has been grouped into a first group and a second group. A given memory drive from a respective group (i) is associated with a respective position in the respective group and (ii) has a respective visual indicator indicative of a status of the given memory drive. The system comprises a first general-purpose-input/output device (GPIO) connected to the first group for controlling visual indicators of the respective ones from the first group, and a second GPIO connected to the second group for controlling visual indicators of the respective ones from the second group. The system comprises a first I2C bus connecting the BMC with the first GPIO for transmitting commands from the BMC to the first GPIO; and a second I2C bus connecting the BMC with the second GPIO for transmitting commands to the GPIO. The system is configured to acquire, by the BMC from the processor, an indication of a faulty memory drive in the JBOD. The indication is indicative of: a target I2C bus amongst the first I2C bus and the second I2C bus, and a position of the faulty memory drive in the target group. The target I2C bus is connected to a target GPIO amongst the first second GPIO and the second GPIO, and the target GPIO is connected to a target group associated with the faulty memory drive amongst the first and the second group. The system is configured to transmit, by the BMC using the target I2C bus, a command to the target GPIO, where the command is for causing the target GPIO to trigger a visual indicator associated with the faulty memory drive based on the position of the faulty memory drive in the target group.

In some embodiments of the system, the first GPIO and the second GPIO have respective unique identifiers, and the system is further configured to transmit, by the target GPIO to the BMC, an indication of the unique identifier of the target GPIO. The unique identifier of the target GPIO and the position of the faulty memory drive in the target group form a unique identifier of the faulty memory drive in the JBOD.

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
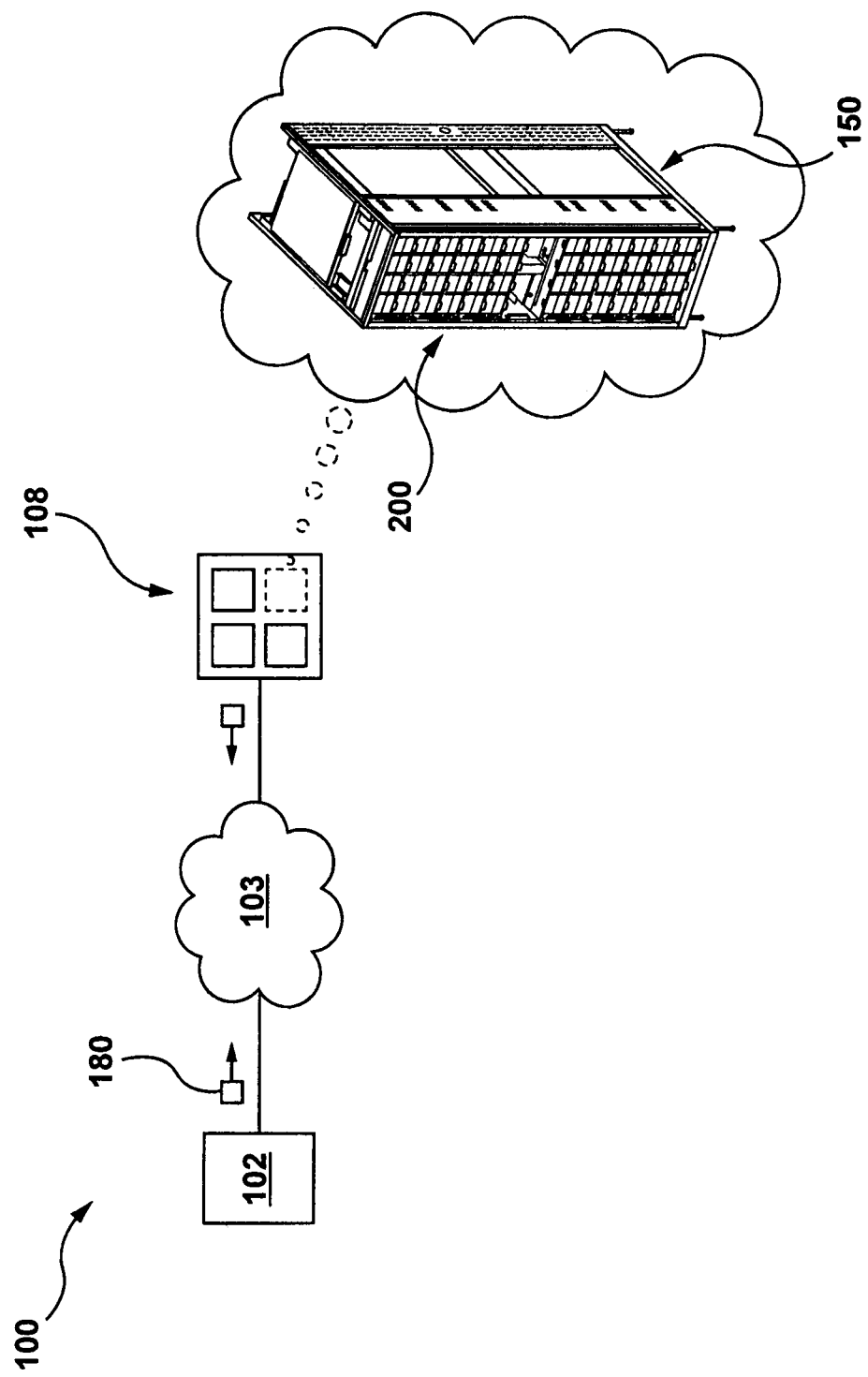
FIG. 1 depicts a system suitable for implementing non-limiting embodiments of the present technology.

Referring to FIG. 1, there is depicted a system 100. The system 100 is configured for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises a request source 102, a communication network 103, and a processing sub-system 108. How the above listed components of the system 100 are implemented in accordance to the various non-limiting embodiments of the present technology will now be described.

Request Source

The request source 102 may be an electronic device associated with an end user (e.g., a client device) or, alternatively, any other sub-system of the system 100 that is configured to provide user requests for the system 100. It should be expressly understood that even though FIG. 1 depicts only a single instance of the request source 102, the system 100 may have multiple instances of the request source 102. As illustrated herein, the request source 102 is part of the system 100; however, in some embodiments of the present technology, the request source 102 may be external to the system 100 and connected via a communication link (not numbered).

In fact, a typical implementation of the system 100 can include a large number of request sources 102, such as hundred instances, thousand instances, million instances, and the like.

In some embodiments of the present technology, where the system 100 is employed in a business-to-customer (B2C) environment, the request source 102 may be a given client device, such as a smartphone, for example, associated with a given user of the system 100. For example, the system 100 may potentially provide cloud storage services for the given client device of the given user.

In other embodiments of the present technology, where the system 100 is employed in a business-to-business (B2B) environment, the request source 102 may be a given sub-system, such as a remote server, for example, providing user requests to the system 100. For example, in some embodiments of the present technology, the system 100 may provide fault-tolerant data processing and/or storage services for an operator of the given sub-system.

Broadly speaking, irrespective of whether the system 100 is implemented as a B2C or a B2B system (or any other variation of the system for that matter), the request source 102 may be a given client device or another sub-system which can be internal or external to the system 100.

As mentioned above, the request source 102 is configured to issue a plurality of requests 180, each of which will be referred herein below as the request 180. The nature of the request 180 will depend on a type of the request source 102 and specific implementations of the present technology.

In some embodiments of the present technology, the request source 102 is also configured to receive a plurality of responses 181, each of which will be referred herein below as the response 181. Generally speaking, in response to the request 180 being processed (or potentially not processed) by the system 100, the system 100 may generate the response 181 destined to the request source 102 associated with the respective request 180. The nature of the response 181 will depend on inter alia a type of the request source 102, the type of the respective request 180 and whether the system 100 processed (or potentially not processed) the respective request 180.

In one example, during processing of the request 180, the system 100 may be configured to request additional data from the request source 102 for continuing or completing processing of the request 180. In such a case, the system 100 may be configured to generate the response 181 in a form of a data-request message being indicative of additional data requested by the system 100 for continuing or completing the processing of the request 180.

In another example, if the system 100 successfully processed the respective request 180, the system 100 may be configured to generate the response 181 in a form of a success message being indicative of successful processing of the respective request 180.

In a further example, if the system 100 failed to successfully process the respective request 180, the system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the system 100, issuing a new request destined to the system 100, and the like.

Communication Network

The request source 102 is communicatively coupled to the communication network 103 for providing the request 180 to the system 100 and for receiving the response 181 from the system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the system 100. For example, this request data-packet may comprise computer-executable instructions written in a given declarative-type programming language which represent the request 180. The communication network 103 is also configured to transmit inter alia a response data-packet comprising the response 181 from the system 100 to the request source 102. For example, this response data-packet may comprise computer-executable instructions representing the response 181.

However, it is contemplated that, in some embodiments of the present technology, where the request source 102 is a given sub-system of the system 100, for example, the communication network 103 may be implemented in a different manner from what is described above or, in some cases, may even be omitted, without departing from the scope of the present technology.

Processing Sub-System

As mentioned above, the system 100 also comprises the processing sub-system 108. Generally speaking, the processing sub-system 108 is configured to process and store data based on the requests 180.

In order to process and store data, the processing sub-system 108 comprises a plurality of server racks 150, each of which will be referred herein below as the server rack 150. In accordance with the various embodiments of the present technology, some or all of the plurality of server racks 150 can be located in a single location or distributed amongst different locations. For example, some or all of the plurality of server racks 150 can be located in a single data center and/or distributed over a plurality data centers.

Generally speaking, a given server rack is a cabinet enclosing a variety hardware equipment and is typically used for housing and organizing hardware equipment in a manner that is suited for the optimization of the equipment and utilization of floor space in the respective data center. In some cases, enclosing hardware equipment in server racks adds extra security against thieves or accidental damage. In other cases, enclosing hardware equipment in server racks allows for better control of airflow and thus improved cooling of the hardware equipment.

The server rack 150 comprises a plurality of trays 200, each of which will be referred herein below as a tray 200. Generally speaking, a given tray 200 allows a human operator to withdraw hardware equipment located in the given tray for inspection, maintenance and replacement.

In some cases, the given tray may include hardware components that together are referred to herein as a "server". In other cases, the given tray may include hardware components that together are referred to herein as a "data storage unit". The server rack 150 may therefore comprise a plurality of server-dedicated trays, each of which includes one or more servers, and a plurality of data storage-dedicated trays, each of which includes one or more data storage units.

Figure 2:
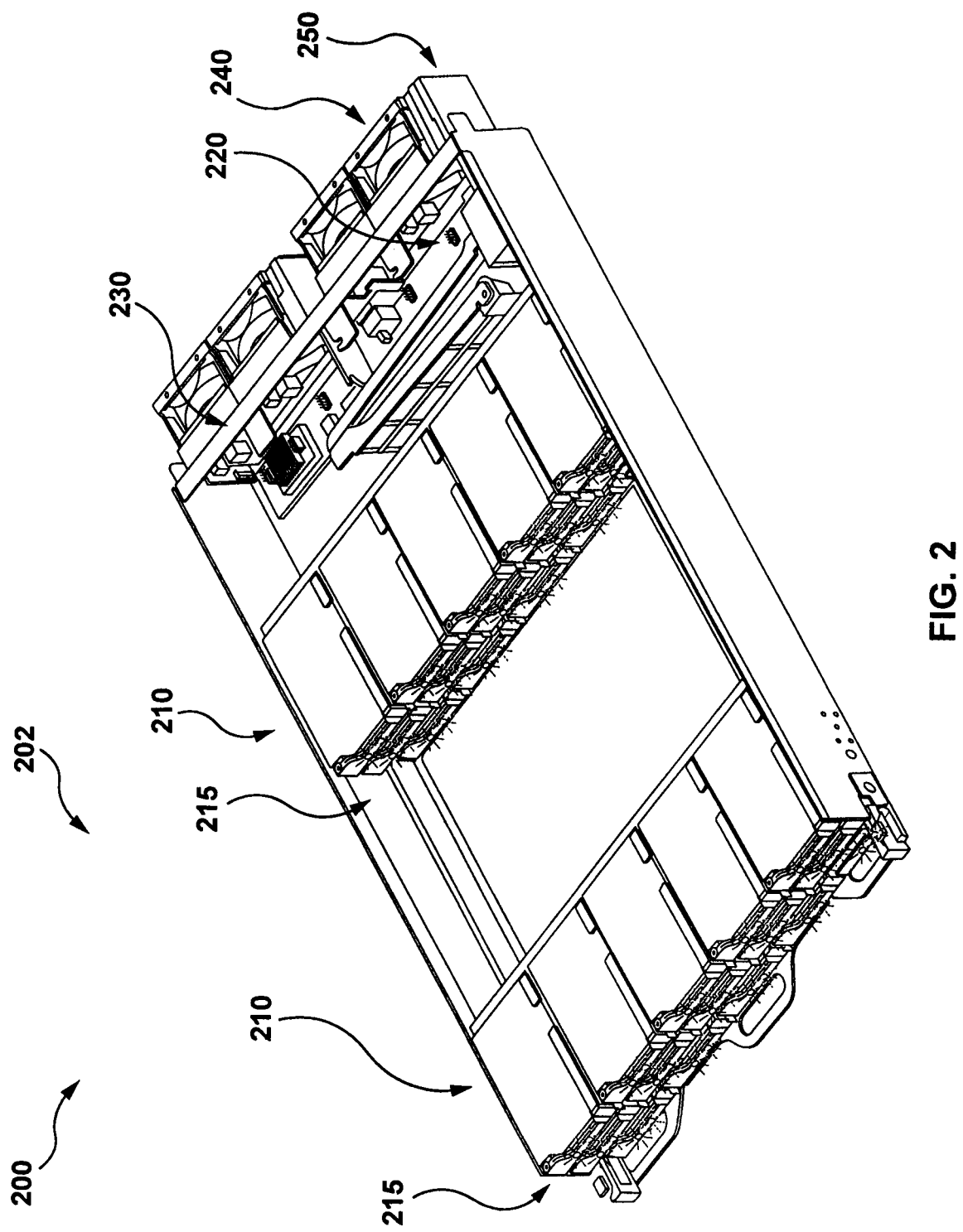
FIG. 2 depicts a top front left perspective view of a tray including a data storage unit of the system of FIG. 1.

With reference to FIG. 2, there is depicted a front top left perspective view of the tray 200 in which a data storage unit 202 is located. In at least one embodiment of the present technology, the data storage unit 202 may be implemented as "Just a Bunch of Drives" (JBOD), which is an architecture using multiple hard drives that may be treated independently or may be combined into one or more logical volumes using a volume manager, or a device-spanning file system. Needless to say, the tray 200 is configured to be moved between a closed position, where only a front panel (not numbered) is accessible to a human operator, and one or more withdrawn positions, where additional components of the JBOD within the tray 200 become accessible to the human operator.

The data storage unit 202 comprises a plurality of memory drives 210, each of which will be referred herein below as the memory drive 210. The memory drive 210 can be implemented as Solid-State Drive (SSD), Hard Disk Drive (HDD), or the like. It is contemplated that the memory drive 210 may be a given movable disk type drive or an immovable (static) disk type drive. It is also contemplated that the plurality of memory drives 210 can include at least some HDDs and at least some SSDs. In one implementation of the present technology, the plurality of memory drives 210 may include 28 memory drives. In other implementations, more or less than 28 memory drives may be included in the data storage unit 202, without departing from the scope of the present technology.

The data storage unit 202 comprises a motherboard 220 which holds and provides communication amongst different hardware components of the data storage unit 202. As depicted in this embodiment, the motherboard 220 holds a service processor 230 of the data storage unit 202 and is adapted for connecting fans (not numbered) and a power supply (not numbered) and a number of buses 250.

It should be noted that the memory drive 210 has visual indicators 215. Broadly speaking, the visual indicators 215 are used for indicating to a human operator the status of the respective memory drive 210. Typically, two visual indicators 215 can be located on the memory drive and can be implemented via light emitting diodes (LEDs) or other suitable means.

When the memory drive 210 needs maintenance or replacement, for example, the system 100 may be configured to trigger a given visual indicator 215 of the memory drive 210 so that the human operator knows which memory drive 210 is to be inspected in a given server room, and more specifically, in the server rack 150. Additional hardware components of the sub-system 108 and how the sub-system 108 is configured to trigger a given visual indicator of a faulty memory drive will now be discussed in greater details with reference to FIG. 3.

Figure 3:
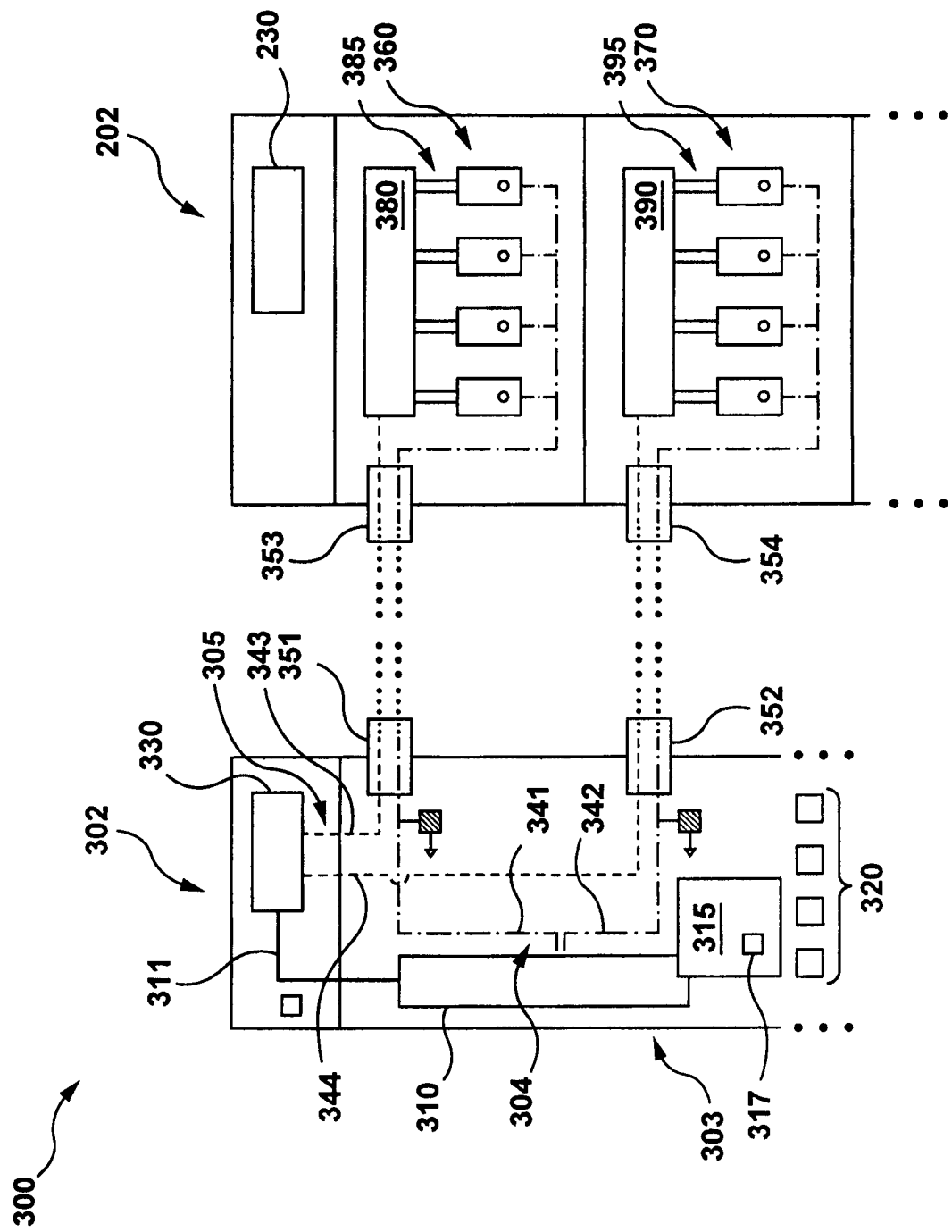
FIG. 3 depicts a representation of the data storage unit of FIG. 2 connected via bus interfaces to a server unit of the system of FIG. 1.

In FIG. 3, there is depicted a schematic representation 300 of the data storage unit 202, a server unit 302, as well as bus interfaces for enabling communication between the data storage unit 202 and the server unit 302 of the processing sub-system 108. As mentioned above, the server unit 302 may be located in a given server-dedicated tray of the server rack 150 and/or an other server rack in the same server room and/or a different server room.

The server unit 302 comprises a "host" portion 303. Broadly speaking, the host portion 303 can be said to be the main processing portion of the server unit 302. The host portion 303 comprises a host processor 310. It is contemplated that more than one host processors 310 may be part of the host portion 303 of the server unit 302. The host portion 303 also comprises a number of other hardware components 320 including, but not limited to: a plurality of volatile memory drives, a plurality of non-volatile memory drives, a plurality network interfaces, plurality of PCIe interfaces for connection of external PCIe devices, and the like. The host portion 303 also comprises connectors 351 and 352 for providing communication between the host portion 303 and the data storage unit 202 via bus interfaces that will be discussed in greater details below.

The host processor 310 is configured to execute an Operating System (OS) 315 of the server unit 302. Broadly speaking, a given OS is a software component that performs a number of tasks of the server unit 302 such as, for example, file management, memory management, process management, handling input and output, and controlling peripheral devices such as memory drives and printers.

The OS 315 may be an "off the shelf" OS and is not particularly limiting. However, in some embodiments, the OS 315 may be implemented as Linux based OS. In other embodiments, the OS 315 may be implemented as a Debian based OS.

The host processor 310 running the OS 315 is also configured to execute a drive-health management application 317. Broadly speaking, the drive-health management application 317 is configured to monitor "health data" acquired by the host processor 310 from the plurality of memory drives 210 and is configured to analyze this health data for determining a health status of one or more memory drives from the plurality of memory drives 210. For example, health data analyzed by the drive-health management application 317 may comprise indications of temperatures, voltages, and currents acquired from respective memory drives 210 (and/or groups thereof). In case of HDDs, the health data analyzed by the drive-health management application 317 may also comprise indications of a number of worn-out sectors on a given HDD.

Which drive-health management application is used is not particularly limited and the selection of a given drive-health management application may depend on inter alia different implementations of the present technology. Irrespective of a specific drive-health management application being used, the drive-health management application 317 is configured to analyze the health data for determining the health status of different drives and identify amongst them one or more faulty drives. In the context of the present technology, the host processor 310 may make use of the drive-health management application 317 for issuing one or more commands for triggering a visual indicator of the faulty drive. How the host processor 310 may use the drive-health management application 317 for issuing said one or more commands will be discussed in details below.

The server unit 302 also comprises a service processor 330. In some embodiments, the service processor 330 may be implemented as a BaseBoard Management Controller (BMC) of the server unit 302. Broadly speaking, the BMC of the server unit 302 is located on the server's motherboard and is used for monitoring the physical state of the server unit 302. It is a specialized microcontroller that can be embedded on the motherboard of a computer, such as a server unit. A BMC can also manage the interface between system-management software and platform hardware. A BMC can have its own firmware and volatile memory. It should be noted that different types of sensors built into the server unit 302 (and potentially of other computer systems in the processing sub-system 108) can report to the BMC on parameters (e.g., of components of the server unit 302 and/or other computer systems in the processing sub-system 108) such as temperature, cooling fan speeds, power status, operating system (OS) status, etc. The BMC can monitor the sensors and can send alerts to a system administrator via the network if any of the parameters do not stay within pre-set limits, indicating a potential failure in the system. The administrator can also remotely communicate with the BMC to take some corrective actions-such as resetting or power cycling the system to get a hung OS running again. These abilities may reduce a total cost of ownership of or operating a system.

Just as examples, the service processor 330 may be used for (i) controlling host power state (power on, power off) and for allowing to remotely power on and power off server unit 302 by means of commands from external systems passed via the network, (ii) monitoring host health (temperatures, hardware errors and exceptions) by means of different hardware sensors like temperature sensors, voltage and current sensors, air flow sensors, (iii) providing remote access via the network to a keyboard, mouse and video monitor of the host portion 303, (iv) controlling cooling fans depending on temperatures of server components, and the like.

In at least some embodiments, the service processor 330 implemented as the BMC of the server unit 302 can be said to be a dedicated computing device inside the server unit 302, and can be powered independently of host portion 303 and powered on when electric power is applied to server unit 302 and before host portion 303 is powered on.

In accordance with what has been described above with reference to FIG. 2, the storage unit 202 has the service processor 230, the plurality of memory drives 210, as well as connectors 353 and 354. Similar to the service processor 330 of the server unit 302, the service processor 230 of the data storage unit 202 may be implemented as the BMC of the data storage unit 202. The service processor 230 is configured to monitor the physical state of the data storage unit 202 and may thus perform similar functions in the data storage unit 202 to the functions performed by the service processor 330 in the server unit 302. However, the functions of the service processor 230 of the data storage unit 202 may also exclude some of the functions of the service processor 330 in the server unit 302 such as, for example, providing access to a keyboard, a mouse and a monitor.

Developers of the present technology have realized that some solutions employ a bus interface between a BMC of a server unit and a BMC of a storage unit for inter alia sending commands for triggering visual indicators of faulty drives. However, BMC-BMC communication is inefficient as it is prone to timeouts, re-tries, and other reasons stemming from the complexity of multi-layer communication protocols that are employed for establishing BMC-BMC communication.

Developers of the present technology have devised a system comprising a server unit, a data storage unit and a bus architecture for providing more efficient communication capabilities between the server unit and the data storage unit. More particularly, the BMC-BMC communication link present in other known solutions may no longer be needed in a bus architecture implemented in accordance with the non-limiting embodiments of the present technology, the bus architecture being between the server unit and the data storage unit. As it will become apparent from the description herein further below, the new bus architecture devised by the developers of the present technology allows inter alia triggering of visual indicators of faulty drives without the need for the BMC of a server unit to communicate with a BMC of a data storage unit.

Returning to the description of FIG. 3, it should be noted that the plurality of memory drives 210 is "grouped" into a set of groups including a first group 360 of memory drives 210, and a second group 370 of memory drives 210. Other memory groups from the plurality of memory drives 210 have been omitted for sake of simplicity only. In one implementation, the data storage unit 202 may include seven groups of memory drives 210, without departing from the scope of the present technology.

In the context of the present technology, each group of memory drives is connected to a respective Serial-to-Parallel-Input/Output (S2PIO) device. Broadly speaking, a given S2PIO device is a given device that, on the one hand, is connected to a serial bus interface, and on the other hand, has a number of parallel I/O connections.

In some embodiments, a given S2PIO device may be a given General Purpose I/O (GPIO) expanding device. Broadly, a GPIO is an uncommitted digital signal pin on an integrated circuit or electronic circuit board which may be used as an input or output.

In one implementation, a PCA9555 may be used as the GPIO expanding device, without departing from the scope of the present technology. The PCA9555 is a 24-pin CMOS device that provides 16 bits of GPIO expansion for I2C-bus/SMBus applications and was developed to enhance the NXP Semiconductors family of I2C-bus I/O expanders. I/O expanders provide a simple solution when additional I/O is needed for ACPI power switches, sensors, push buttons, LEDs, fans, etc. The PCA9555 consists of two 8-bit Configuration (Input or Output selection); Input, Output and Polarity Inversion (active HIGH or active LOW operation) registers. The I/Os can be enabled as either inputs or outputs by writing to the I/O configuration bits. The data for each Input or Output is kept in the corresponding Input or Output register. The polarity of the read register can be inverted with the Polarity Inversion register. The PCA9555 open-drain interrupt output can be activated when any input state differs from its corresponding input port register state and is used to indicate to the system controller that an input state has changed. Three hardware pins (A0, A1, A2) vary the fixed I2C-bus address and allow up to eight devices to share the same I2C-bus/SMBus.

In other embodiments, however, the S2PIO may be implemented as a given Complex Programmable Logic Device (CPLD), a Field-Programmable Gate Array (FPGA), and the like, without departing from the scope of the present technology. It is contemplated that a given S2PIO device may be configured to convert data received over a respective serial bus into states that its I/O pins ought to have, change the states of its I/O pins, and may convert data indicative of the current states of its I/O pins into data to be carried by the respective serial bus.

As depicted, the first group 360 is connected to a first S2PIO device 380 via links 385 and the second group 370 is connected to a second S2PIO device 390 via links 395. It should be noted that a given memory drive has a relative position in the respective group of memory drives. For example, in a given group of four drives, a given drive may be a first, a second, a third, or a fourth drive depending on which links are connecting it to the respective S2PIO device. For example, if the given drive is connected to a first set of links amongst the links of the respective S2PIO device, then the drive may be considered as the first drive in the respective group of four drives. In the same example, if the given drive is connected to a second set of links amongst the links of the respective S2PIO device, then the drive may be considered as the second drive in the respective group of four drives. Which drive in the group of drives has which relative position is less important than the fact that each drive has a unique relative position in a respective group of drives.

The first S2PIO device 380 and the first group 360 of memory drives 210 are connected to a connector 353 via respective bus interfaces for communication with the server unit 302. The second S2PIO device 390 and the second group 370 of memory drives are connected to a connector 354 via respective bus interfaces for communication with the server unit 302. It should be noted that the memory drives 210 are connected with the server unit 302 by a first bus interface 304, and the S2PIO devices are connected with the server unit 302 by a second bus interface 305.

In some embodiments of the present technology, the first bus interface 304 may be a Serial AT Attachment (SATA) bus interface. Broadly speaking, SATA is a computer bus interface that connects host bus adapters to mass storage devices such as HDDs, optical drives, and SSDs. In other embodiments, the first bus interface may be implemented as SCSI, SAS and PCIe buses.

In the illustrated example, the first group 360 of memory drives 210 can be connected to the host processor 310 by a first SATA link 341 passing through the connectors 351 and 353. In the same example, the second group 370 of memory drives 210 can be connected to the host processor 310 by a second SATA link 342 passing through the connectors 352 and 354.

The first bus interface 304 is configured for transmission of I/O operations between the host processor 310 and the memory drives 210. The first bus interface 304 is also configured for transmission of health data between the memory drives 210 to the host processor 310 for management and analysis by the drive-health management application 317.

In some embodiments of the present technology, the second bus interface 305 may be an Inter-Integrated Circuit (I2C) bus interface. Broadly speaking, I2C is a synchronous, multi-master, multi-slave, packet switched, single-ended, serial communication bus widely used for attaching lower-speed peripheral ICs to processors and/or microcontrollers. It should be noted that one subset of I2C busses is called a System Management Bus (SMBus). One purpose of SMBus is to promote robustness and interoperability. Accordingly, modern I2C systems incorporate some policies and rules from SMBus, sometimes supporting both I2C and SMBus, requiring only minimal reconfiguration either by commanding or output pin use. In other embodiments, the second bus interface may be implemented via CANbus, RS-422 (ANSI/TIA/EIA-422-B).

In the illustrated example, the first S2PIO device 380 can be connected to the service processor 330 of the server unit 302 by a first I2C link 343 passing through connectors 351 and 353. In the same example, the second S2PIO device 390 can be connected to the service processor 330 of the server unit 302 by a second I2C link 344 passing through connectors 352 and 354.

The second bus interface 305 is configured for transmission of commands from the service processor 330 of the server unit 302 and the respective S2PIO devices. Commands transmitted over the second bus interface 305 may include commands for triggering visual indicators of respective memory drives 210. The second bus interface 305 is also configured for provision of information about the respective S2PIO devices and current states of the respective inputs and outputs (pins) to the service processor 330 of the server unit 302.

How the processing sub-system 108 is configured to operate for triggering a visual indicator of a given faulty drive will now be discussed with reference to FIG. 4. The host processor 310 is configured to receive health data 402 over the second SATA link 342 and may provide the health data 402 to the drive-health management application 317. The health data 402 comprises information indicative of the health status of memory drives 210 in the corresponding target group of memory drives associated with the second SATA link 342. It should be noted that the host processor 310 is in a sense "unaware" which memory drives 210, specifically, are associated with the second SATA link 342. In other words, the host processor 310 does not know (yet) which group of drives in the data storage unit 202 is the target group of drives connected over the second SATA link 342.

The host processor 310 employs the drive-health management application 317 for determining which one (if any) of the memory drives 210 from that target group of memory drives is a faulty memory drive. For example, the drive-health management application 317 may determine based on the health data 402 that a second memory drive from the target group of memory drives (relative position of the drive in the group) is faulty. Again, it should be noted that the host processor 310 does not know whether the target group of memory drives corresponding to the second SATA link 342 is the first group 360 or the second group 370—the host processor 310 knows based on the health data 402 that the second memory drive (relative position) over the second SATA link 342 is likely to be faulty.

The host processor 310 is configured to issue a command 404 over a link 311 to the service processor 330. The command 404 is configured to instruct the service processor 330 to trigger a visual indicator of the faulty memory drive. The command 404 may be transmitted over the link 311 in accordance with an OEM IPMI protocol, for example. The command 404 comprises information indicative of (i) a relative position of the faulty memory drive in the target group and (ii) a link over which the health data 402 has been acquired by the host processor 310. In other words, the command 404 comprises information indicative of that the second memory drive from a given group of memory drives connected over the second SATA link 342 (via the connectors 352 and 354) is a faulty memory drive.

The service processor 330 is configured to process the command 404 in order to (i) generate a command 406 for triggering the visual indicator of a second one from a target group of memory drive, and (ii) identify a target I2C link over which the command 406 is to be transmitted. In this example, the service processor 330 may identify based on the command 404 that the target I2C link over which the command 406 is to be sent is the second I2C link 342 (via the connectors 352 and 354). As such, the service processor 330 is configured to issue the command 406 over the second I2C link 342. The command 406 is a low-level command carrying information about which I/O pin of the corresponding target S2PIO device should change its state.

The command 406 is received by the target S2PIO device and is indicative of that the state of the pin associated with a visual indicator of the second memory drive within the target group should be changed. The target S2PIO device changes the state of the corresponding pin, thereby triggering the visual indicator of the faulty drive. The so-triggered visual indicator may help the human operator to perform maintenance on the faulty drive by visually displaying the faulty status of the drive.

It should be noted that each S2PIO device may have a unique identifier amongst the S2PIO devices associated with respective groups of memory drives 210 in the data storage unit 202. It is contemplated that the target S2PIO device is configured to return to the service processor 330 information indicative of its respective unique identifier. As a result, the service processor 330 now is "aware" of which memory drive, specifically, is the faulty memory drive. Indeed, based on the information provided by the target S2PIO device over the second I2C link 342, the service processor 330 can be configured to identify the target S2PIO device as the second S2PIO device 390 associated with the second group 370 of memory drives. In combination with information indicative of the relative position of the faulty memory drive in the target group (the second memory drive from the target group), the service processor 330 may be configured to identify the faulty memory drive as the second memory drive 210 from the second group 370 of memory drives connected to the second S2PIO device 390. Put another way, the service processor 330 may determine an absolute position of the faulty memory drive by having access to information indicative (i) of which S2PIO device in the data storage unit 202 is the target S2PIO, and (ii) which memory drive of the respective target group is the faulty drive.

In some embodiments, it is contemplated that identification of the specific memory drive (target I2C link and relative position of the faulty drive amongst the target group) as the faulty drive may allow the service processor 330 of the server unit 302 to provide support to the human operator during maintenance.

For example, let it be assumed that the human operator decides to disconnect the faulty memory drive and replace it with a new one, but erroneously disconnects the wrong memory drive for replacement. In this example, let it also be assumed that the human operator disconnects the third memory drive in the second group 370 instead of the second memory drive. The target S2PIO device (the second S2PIO device 390) may be configured to read the current states of its pins and determine that the pins of the third memory drive amongst its group of drives have been disconnected. This information may be transmitted to the service processor 330 via the second I2C link 342, and then to the host processor 310 via link 311. The drive-health management application 317 may be configured to compare the so-acquired information with information identifying the faulty drive. In this example, the drive-health management application 317 may determine that a memory drive that is different from the faulty memory drive has been disconnected from the target group of drives. The drive-health management application 317 may be configured to issue one or more remedial actions for notifying the human operator to that effect.

Figure 5:
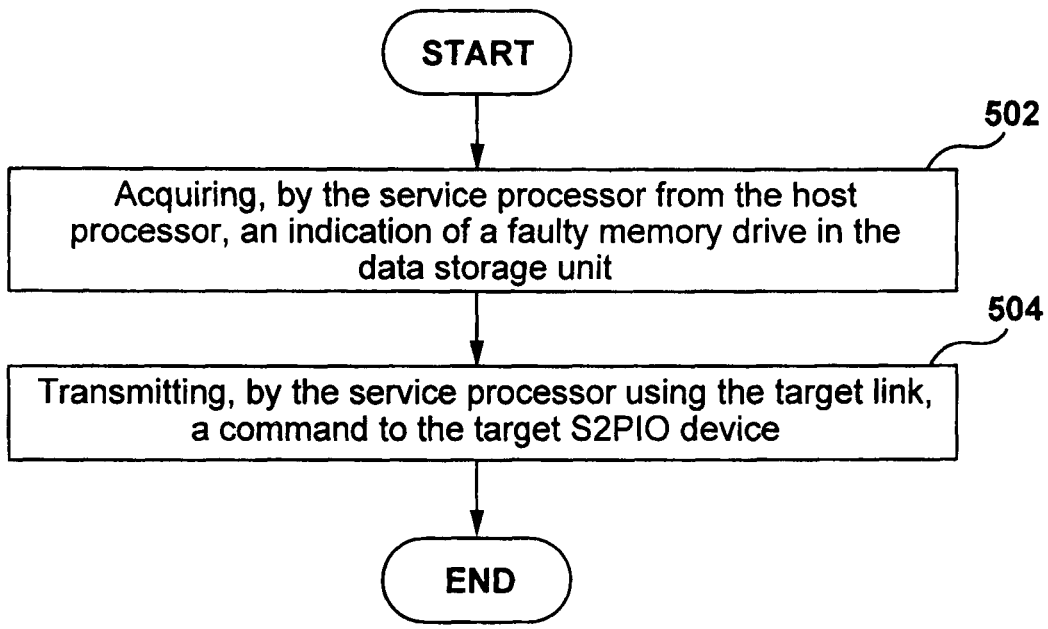
FIG. 5 is a schematic block diagram of a method executable in some embodiments of the present technology.

In some embodiments of the present technology, it is contemplated that the system 108 may be configured to execute a method 500, the scheme-block representation of which is illustrated in FIG. 5. Various steps of the method 500 will now be described in detail.

STEP 502: Acquiring, by the Service Processor from the Host Processor, an Indication of a Faulty Memory Drive in the Data Storage Unit The method 500 begins at step 502 with a service processor acquiring from a host processor an indication of a faulty memory drive in a data storage unit.

Figure 4:
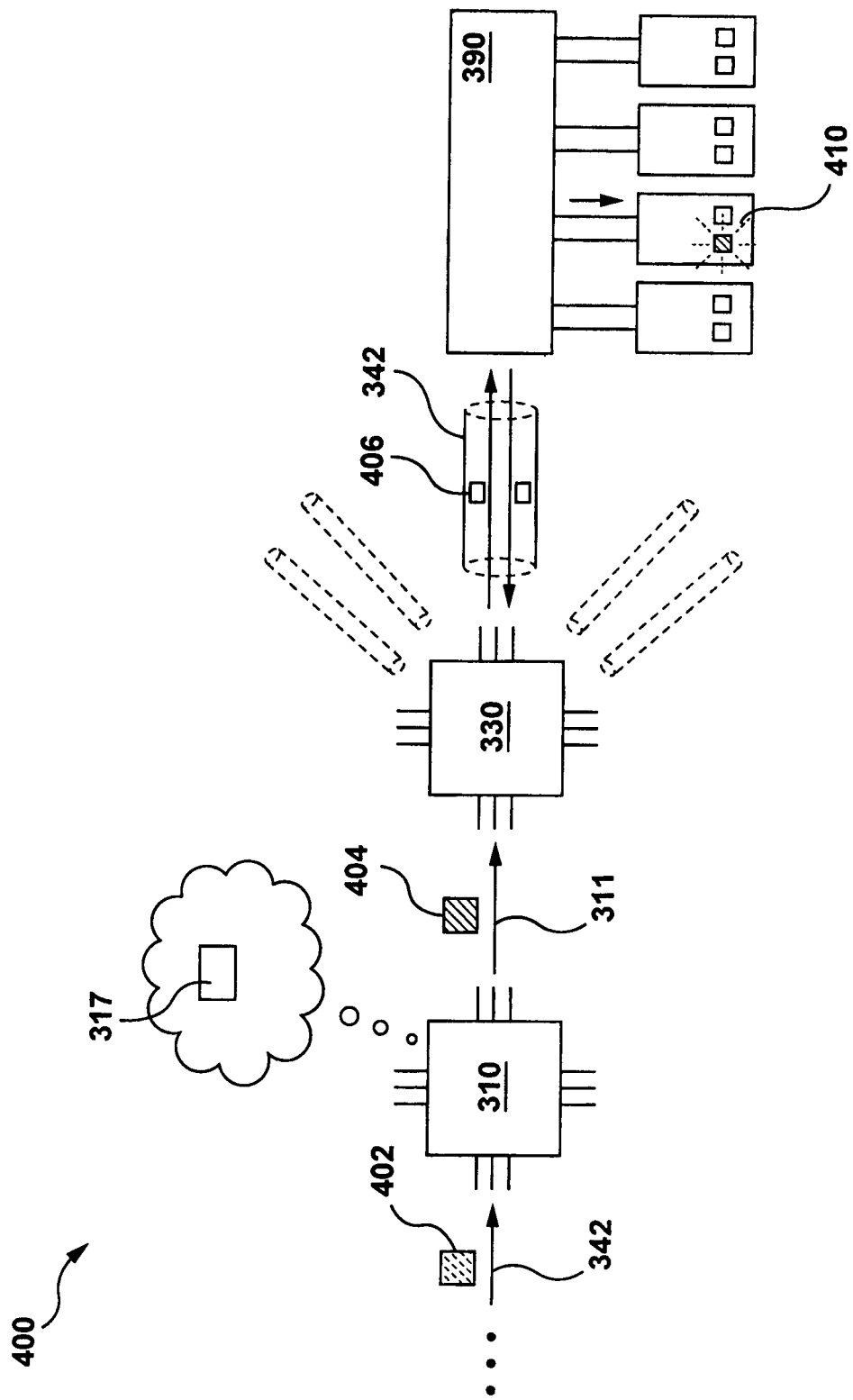
FIG. 4 depicts a schematic representation of a process for the server unit of FIG. 3 to trigger a visual indicator of a memory drive of the data storage unit.

In one example, during the step 502, the host processor 310 may be configured to transmit the command 404 to the service processor 330 (see FIG. 4). It should be noted that the command 404 is transmitted from the host processor 310 of the server unit 302 to the service processor 330 of the server unit 302. It is contemplated that the host processor 310 may be a given processor of a host portion of a given server unit, whereas the service processor 330 may be the BMC of the given (same) server unit.

The command 404 may carry the indication of the faulty memory drive 410 in the data storage unit 202. It should be noted that the plurality of memory drives in the data storage unit 202 (used for executing the I/O operations) is grouped into respective groups of memory drives 210. A given memory drive from a respective group is associated with a respective position in the respective group (such as first second third and fourth positions in groups of four memory drives, for example) and has at least one respective visual indicator for displaying a status of the given memory drive. A given group of drives is connected to a respective S2PIO device for monitoring and controlling the visual indicators of the respective memory drives in the given group. In one example, a given S2PIO device may be a GPIO expanding device. It can be said that in some embodiments, the visual indicators within a given group of drives may be controlled via the respective S2PIO device, instead of a local BMC such as the BMC of the respective data storage unit. A given group of drives is also connected to a given host processor of a server unit. In one example, the given group of drives may be connected to the given host processor via one or more SATA bus links. A given S2PIO device is connected to a given service processor of the same server unit. In one example, a given GPIO expanding device may be connected to the BMC of the server unit via a respective I2C link.

The command 404 may be carrying the indication. The indication is indicative of a target link amongst the first link and the second link of a given bus interface, such as a I2C bus interface, for example. The target link is connected to a target S2PIO device amongst the S2PIO devices in the data storage unit 202. The target S2PIO device is connected to a target group associated with the faulty memory drive 410 amongst the groups of memory drives in the data storage unit 202. The indication is also indicative of a position of the faulty memory drive 410 in the target group. The host processor 310 may generate the command 404 once the health-drive management application 317 acquires and analyses the health data 402. The health data 402 may be acquired via a given link of an other bus interface, such as a SATA bus interface, for example.

STEP 504: Transmitting, by the Service Processor Using the Target Link, a Command to the Target S2PIO Device The method 500 continues to step 504 with the service processor transmitting a given command to the target S2PIO device via the target link. The given command is for causing the target S2PIO device to trigger a visual indicator associated with the faulty memory drive based on the position of the faulty memory drive in the target group. It should be noted that the indication of the target link acquired at the step 502 may be used by the service processor 330 for determining which one of the links of the given bus interface (e.g., I2C bus interface) should carry the given command, while the indication of the position of the faulty memory drive in the target group acquired at the step 502 may be used by the service processor 330 for indicating to the target S2PIO device receiving the given command which visual indicator it is connected to should be triggered.

In some embodiments, the target S2PIO may be configured to transmit to the service processor 330 via the target link an indication of the unique identifier of the target S2PIO. It should be noted that the unique identifier of the target S2PIO and the position of the faulty memory drive 410 in the target group form a unique identifier of the faulty memory drive 410 in the data storage unit 202. The unique identifier of the faulty memory drive 410 may be used for monitoring inspection and/or replacement of the faulty memory drive 410.

It should be noted that the server unit 302 and the data storage unit 202 are connected via a first bus interface such as a SATA bus interface and a second bus interface such as an I2C bus interface. The SATA bus interface may connect the host processor 310 with the drives in the groups of drives and the I2C bus interface may connect the service processor 330 with the S2PIO devices. It is contemplated that the plurality of memory drives may comprise at least one of a HDD and a SSD.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A system comprising:
a server unit including a host processor for generating input/output (I/O) operations and a service processor for monitoring a physical state of the server unit;
a first bus interface for transmitting the I/O operations from the host processor to a data storage unit for execution;
the data storage unit including:
a plurality of memory drives for executing the I/O operations, the plurality of memory drives having been grouped into a first group and a second group, a given memory drive from a respective group (i) being associated with a respective position in the respective group and (ii) having a respective visual indicator indicative of a status of the given memory drive;
a first serial-to-parallel-input/output (S2PIO) device connected to the first group for controlling visual indicators of the respective memory drives from the first group,
a second S2PIO device connected to the second group for controlling visual indicators of the respective memory drives from the second group,
a second bus interface for transmitting commands from the service processor to the first and second S2PIO devices, the second bus interface including:
a first link between the service processor and the first S2PIO device and a second link between the service processor and the second S2PIO device,
the system being configured to:
acquire, by the service processor from the host processor, an indication of a faulty memory drive in the data storage unit, the indication being indicative of:
(i) a target link amongst the first link and the second link,
the target link being connected to a target S2PIO device amongst the first S2PIO device and the second S2PIO device,
the target S2PIO device being connected to a target group associated with the faulty memory drive amongst the first and the second group; and
(ii) a position of the faulty memory drive in the target group; and
transmit, by the service processor using the target link, a command to the target S2PIO device, the command for causing the target S2PIO device to trigger a visual indicator associated with the faulty memory drive based on the position of the faulty memory drive in the target group.

2. The system of claim 1, wherein the first S2PIO device and the second S2PIO device have respective unique identifiers, and wherein the system is further configured to:
transmit, by the target S2PIO device to the service processor, an indication of the unique identifier of the target S2PIO device,
the unique identifier of the target S2PIO device and the position of the faulty memory drive in the target group forming a unique identifier of the faulty memory drive in the data storage unit.

3. The system of claim 1, wherein the service processor of the server unit is a BaseBoard Management Controller (BMC) of the server unit.

4. The system of claim 1, wherein the first bus interface is a Serial AT Attachment (SATA) bus interface.

5. The system of claim 1, wherein the second bus interface is an Inter-Integrated Circuit (I2C) bus interface, and wherein the first link is a first I2C link and the second link is a second I2C link.

6. The system of claim 1, wherein the data storage unit is a just-a-bunch-of-disks (JBOD) unit.

7. The system of claim 1, wherein the plurality of memory drives comprises at least one of a Hard Disk Drive (HDD) and a Solid-State Drive (SSD).

8. The system of claim 1, wherein the first S2PIO device is a General Purpose I/O (GPIO) expander device.

9. The system of claim 8, wherein the GPIO expander device is a PCA9995.

10. The system of claim 1, wherein the first S2PIO device is a Complex Programmable Logic Device (CPLD).

11. The system of claim 1, wherein the first S2PIO device is a Field-Programmable Gate Array (FPGA).

12. A computer-implemented method of triggering an indicator of a faulty memory drive, the method executable by a system,
the system comprising:
a server unit including a host processor for generating input/output (I/O) operations and a service processor for monitoring a physical state of the server unit;
a first bus interface for transmitting the I/O operations from the host processor to a data storage unit for execution;
the data storage unit including:
a plurality of memory drives for executing the I/O operations, the plurality of memory drives having been grouped into a first group and a second group,
a given memory drive from a respective group (i) being associated with a respective position in the respective group and (ii) having a respective visual indicator indicative of a status of the given memory drive;
a first serial-to-parallel-input/output (S2PIO) device connected to the first group for controlling visual indicators of the respective memory drives from the first group,
a second S2PIO device connected to the second group for controlling visual indicators of the respective memory drives from the second group,
a second bus interface for transmitting commands from the service processor to the first and second S2PIO devices, the second bus interface including:
a first link between the service processor and the first S2PIO device and a second link between the service processor and the second S2PIO device,
the method comprising:
acquiring, by the service processor from the host processor, an indication of a faulty memory drive in the data storage unit, the indication being indicative of:
(i) a target link amongst the first link and the second link,
the target link being connected to a target S2PIO device amongst the first S2PIO device, and the second S2PIO device,
the target S2PIO device being connected to a target group associated with the faulty memory drive amongst the first and the second group; and
(ii) a position of the faulty memory drive in the target group; and
transmitting, by the service processor using the target link, a command to the target S2PIO device, the command for causing the target S2PIO device to trigger a visual indicator associated with the faulty memory drive based on the position of the faulty memory drive in the target group.

13. The computer-implemented method of claim 12, wherein the method further comprises:
transmitting, by the target S2PIO device to the service processor, an indication of a unique identifier of the target S2PIO device,
the unique identifier of the target S2PIO device and the position of the faulty memory drive in the target group forming a unique identifier of the faulty memory drive in the data storage unit.

14. The computer-implemented method of claim 12, wherein the first bus interface is a Serial AT Attachment (SATA) bus interface.

15. The computer-implemented method of claim 12, wherein the second bus interface is an Inter-Integrated Circuit (I2C) bus interface, and wherein the first link is a first I2C link and the second link is a second I2C link.

16. The computer-implemented method of claim 12, wherein the data storage unit is a just-a-bunch-of-disks (JBOD) unit.

17. The computer-implemented method of claim 12, wherein the plurality of memory drives comprises at least one of a Hard Disk Drive (HDD) and a Solid-State Drive (SSD).

18. The computer-implemented method of claim 12, wherein the first S2PIO device is a General Purpose I/O (GPIO) expander device, a Complex Programmable Logic Device (CPLD), or a Field-Programmable Gate Array (FPGA).

19. A system comprising:
a server unit including a processor for generating input/output (I/O) operations and a Baseboard Management Controller (BMC) for monitoring a physical state of the server unit;
a just-a-bunch-of-disks (JBOD), the JBOD coupled to the server unit by a SATA bus for receiving the I/O operations from the processor, the JBOD including:
a plurality of memory drives for executing the I/O operations, the plurality of memory drives having been grouped into a first group and a second group,
a given memory drive from a respective group (i) being associated with a respective position in the respective group and (ii) having a respective visual indicator indicative of a status of the given memory drive;
a first general-purpose-input/output (GPIO) device connected to the first group for controlling visual indicators of the respective memory drives from the first group,
a second GPIO device connected to the second group for controlling visual indicators of the respective memory drives from the second group,
a first Inter-Integrated Circuit (I2C) bus connecting the BMC with the first GPIO device for transmitting commands from the BMC to the first GPIO device; and
a second I2C bus connecting the BMC with the second GPIO device for transmitting commands to the second GPIO device,
the system being configured to:
acquire, by the BMC from the processor, an indication of a faulty memory drive in the JBOD, the indication being indicative of:
(iii) a target I2C bus amongst the first I2C bus and the second I2C bus,
the target I2C bus being connected to a target GPIO device amongst the first GPIO device and the second GPIO device,
the target GPIO device being connected to a target group associated with the faulty memory drive amongst the first and the second group; and
(iv) a position of the faulty memory drive in the target group; and
transmit, by the BMC using the target I2C bus, a command to the target GPIO device, the command for causing the target GPIO device to trigger a visual indicator associated with the faulty memory drive based on the position of the faulty memory drive in the target group.

20. The system of claim 19, wherein the first GPIO device and the second GPIO device have respective unique identifiers, and wherein the system is further configured to:
transmit, by the target GPIO device to the BMC, an indication of the unique identifier of the target GPIO device,
the unique identifier of the target GPIO device and the position of the faulty memory drive in the target group forming a unique identifier of the faulty memory drive in the JBOD.

* * * * *